United States Patent
Levin et al.

(10) Patent No.: US 6,755,381 B1
(45) Date of Patent: Jun. 29, 2004

(54) PORTABLE SIGN STAND WITH LEG RELEASE MECHANISM

(75) Inventors: Yevgeniy M. Levin, Novi, MI (US); David U. Hillstrom, Novi, MI (US)

(73) Assignee: Marketing Displays, Inc., Farmington Hills, MI (US)

( * ) Notice: Subject to any disclaimer, the term of this patent is extended or adjusted under 35 U.S.C. 154(b) by 0 days.

(21) Appl. No.: 10/041,345

(22) Filed: Jan. 8, 2002

(51) Int. Cl.[7] ............................................. F16M 11/32
(52) U.S. Cl. ................................... 248/163.1; 248/432
(58) Field of Search ........................... 248/163.1, 432, 248/168, 170, 440.1, 151; 29/525.02, 525.08, 700, 795

(56) References Cited

U.S. PATENT DOCUMENTS

| | | | |
|---|---|---|---|
| 601,613 A | 3/1898 | Castle | 403/325 |
| 691,050 A | 1/1902 | Dronne | 403/325 |
| 3,608,935 A | 9/1971 | Hodapp | 403/325 |
| 4,366,910 A * | 1/1983 | Uccello et al. | 211/191 |
| 4,507,887 A | 4/1985 | Seely | 40/606 |
| 4,548,379 A | 10/1985 | Seely et al. | 248/624 |
| 4,593,879 A * | 6/1986 | Seely et al. | 248/160 |
| 4,676,015 A | 6/1987 | Stoudt | 40/608 |
| 4,691,892 A * | 9/1987 | Grewe et al. | 248/160 |
| 4,954,008 A | 9/1990 | Dicke et al. | 403/24 |
| 5,340,068 A | 8/1994 | Sarkisian et al. | 248/188.6 |
| 5,525,000 A | 6/1996 | Belobraydich et al. | 403/102 |
| 5,611,509 A * | 3/1997 | Kulp et al. | 248/171 |
| 5,683,201 A | 11/1997 | Guaron | 403/325 |
| 5,725,186 A | 3/1998 | Hillstrom et al. | 248/176.1 |
| 5,829,178 A * | 11/1998 | Hillstrom | 248/170 |
| 6,041,584 A * | 3/2000 | Hohnl | 280/43 |
| 6,056,250 A * | 5/2000 | Hillstrom et al. | 248/127 |
| 6,237,268 B1 * | 5/2001 | Levin | 248/160 |
| 6,237,883 B1 * | 5/2001 | Levin et al. | 248/176.1 |
| 2002/0096617 A1 * | 7/2002 | Marcotte et al. | 248/548 |

FOREIGN PATENT DOCUMENTS

FR 423205 4/1911 ................. 403/96

* cited by examiner

Primary Examiner—Korie Chan
Assistant Examiner—A. Joseph Wujciak
(74) Attorney, Agent, or Firm—Harness, Dickey & Pierce, P.L.C.

(57) ABSTRACT

A portable sign assembly having a base assembly which includes a leg member pivotally interconnected with a base plate of the base assembly. A leg release mechanism is further provided for selectively locking a respective leg from pivoting relative to a respective base plate. The release mechanism includes a lock-pin that is slidably disposed through the leg and is biased in a first position by a biasing member disposed within the leg. The lock-pin selectively engages apertures of the base plate for prohibiting pivotal motion between the leg and the base plate.

23 Claims, 4 Drawing Sheets

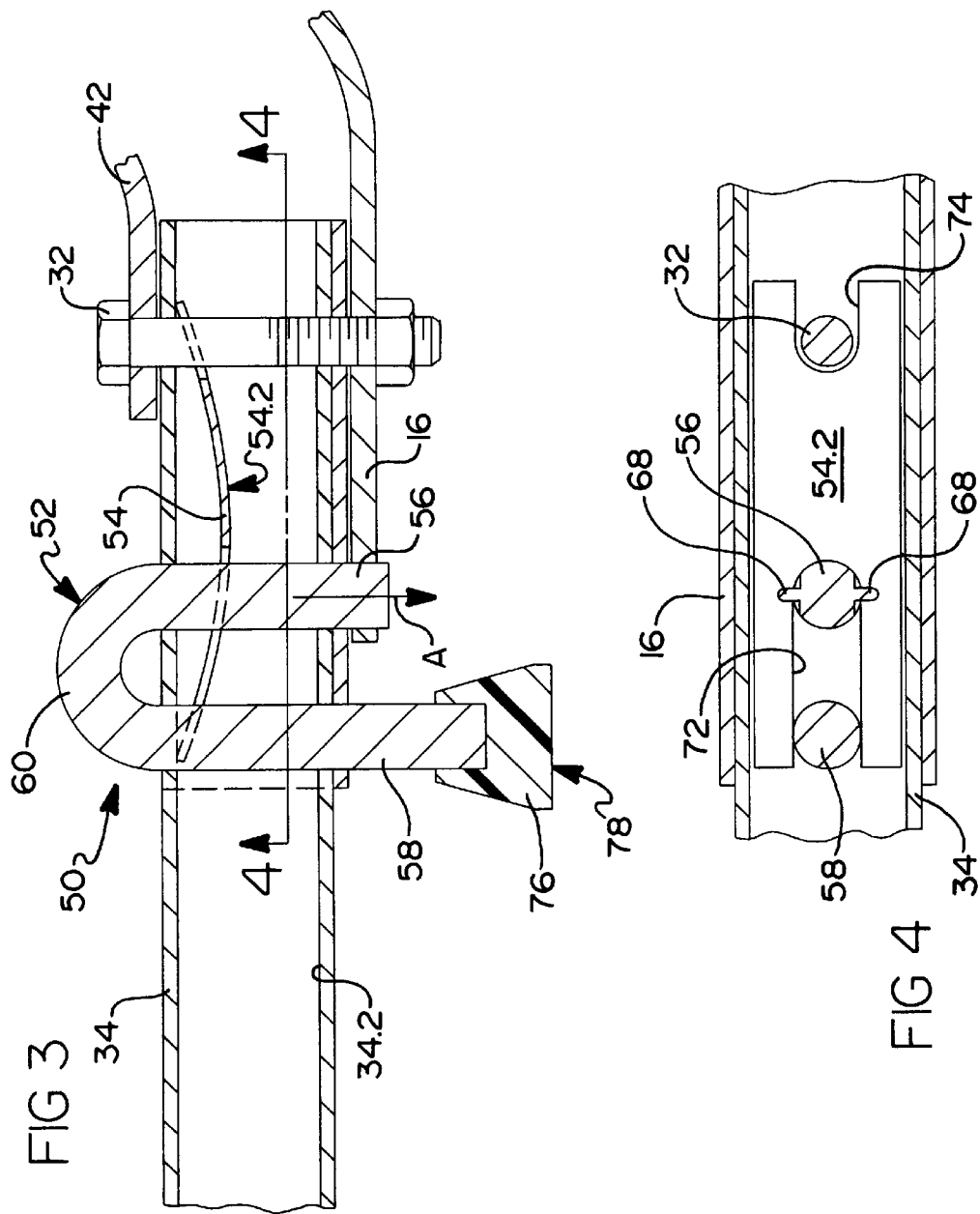

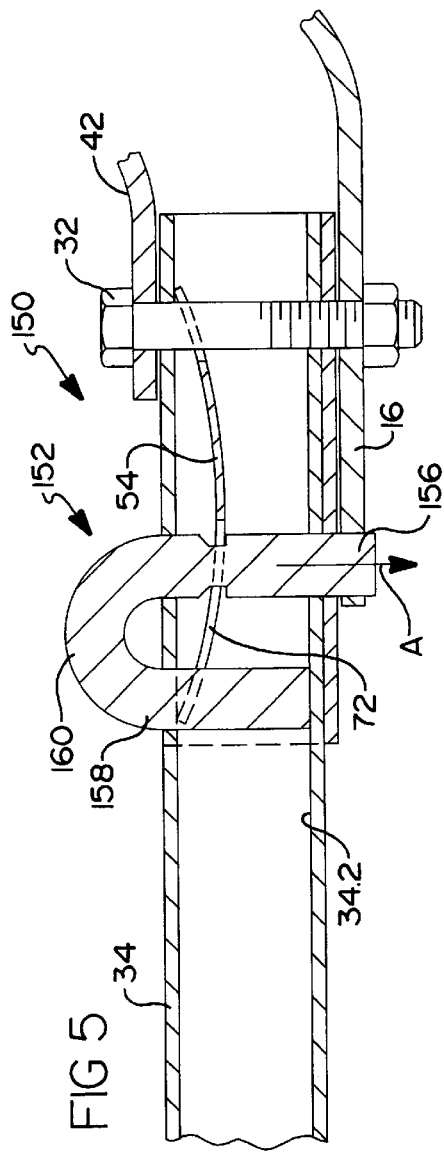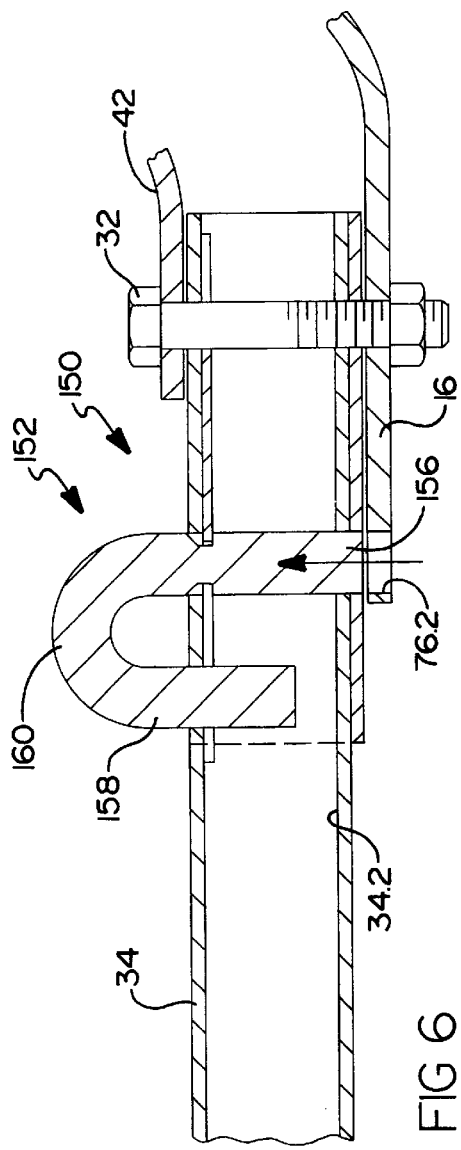

PORTABLE SIGN STAND WITH LEG RELEASE MECHANISM

FIELD OF THE INVENTION

The present invention relates to portable sign stands, and more particularly, to a leg release mechanism for quickly and easily locking a sign stand leg in a retracted or protracted position.

BACKGROUND OF THE INVENTION

There are many uses for signage products today, particularly for traffic control at road construction sites and other work areas along the nation's highways. Many of these signage products utilize portable sign stands or sign holders for temporarily locating and displaying signs of various sizes and shapes. Rigid signs such as aluminum or plywood have typically been used in such applications. However, there has been a recent trend, particularly with portable traffic control signage, towards the use of flexible, roll-up signs, which have been well-received due to their lightweight and compact nature. It is anticipated that this trend will continue due to benefits gained by the compactness, portability and storability of flexible sign systems, as well as the durability of their design and the minimal maintenance required for their upkeep.

In general, various portable sign stands have been developed which utilize an upright that is attached to a base assembly having a leg assembly including a number of legs that pivotally and telescopically extend to support the sign. In addition, the legs are generally positionable between a retracted position wherein the legs are positioned closely parallel to the upright for convenient storage and a protracted position wherein the legs extend outwardly from the upright for securely supporting the sign. A release mechanism is incorporated into the base assembly for releasably securing the legs in the retracted or protracted position. The base assembly often includes a resilient spring member between the leg assembly and the upright to control deflection of the sign whenever a force is applied thereto, such as a gust of wind impinging upon the sign panel.

The flexible roll-up sign has a pair of brace members attached to the corners of a flexible sign panel which in a deployed or use position form a cross configuration. Various fasteners can be used for this purpose including twist lock fasteners, hook and loop type fasteners, snaps, plastic pockets or stretchable rubber or elastic straps. Fasteners of the latter type are marketed and sold by Marketing Displays International, Inc. of Farmington Hills, Mich. under the trademark DuraLatch™. The flexible roll-up sign is releasably secured to the sign stand by a locking mechanism such as a cam lock or lock pin assembly.

Preferred embodiments of the type of sign stands described above are disclosed in the following U.S. patents: U.S. Pat. No. 6,056,250 entitled "Improved Sign Stand For Flexible Traffic Control Signage", U.S. Pat. No. 6,032,908 entitled "Sign Stand With Cam Release Assembly" and U.S. Pat. No. 5,472,162 entitled "Cap Lock For Sign Stand." The above-referenced applications are commonly owned by the assignee of the present invention and the disclosures are expressly incorporated by reference herein.

Signage systems of the type described above have several moving parts that must operate easily and repeatedly in adverse conditions with little or no maintenance. These signage systems are commonly set up along busy roads and highways such that continuous efforts are made to improve the ease of use and durability of these systems. In this regard, there is a need to provide a release mechanism for the leg assembly, and more particularly to provide a simpler, more cost-effective release mechanism for the leg assembly which is simple to assemble, quick and easy to operate and requires no significant maintenance and is substantially wear-resistant.

SUMMARY OF THE INVENTION

It is a principle object of the present invention to provide a portable sign stand having an improved leg release mechanism for releasably positioning the legs of the stand between a retracted position and multiple protracted positions.

It is another object of the present invention to provide a method of constructing an improved leg release mechanism, which is low in cost and simple to manufacture and assemble.

It is a further object of the present invention to provide an improved "foot-operated" leg release mechanism for releasably locking the leg assembly in the retracted or protracted positions.

Accordingly, the present invention is directed to a portable sign stand comprising a base assembly having a leg pivotally connected to a base plate and a release mechanism for selectively permitting pivoting of the leg relative to the base plate. The release mechanism includes a lock-pin slidably disposed through a cavity of the leg between a first and second position. In the first position the lock-pin extends into an aperture of the base plate and in the second position the lock-pin is withdrawn from the aperture. A biasing member is disposed within the cavity and in direct connection with the lock-pin for biasing the lock-pin in the first position. When the lock-pin is in the first position pivoting of the leg relative to the base plate is disabled. When the lock-pin is in the second position pivoting of the leg relative to the base plate is enabled.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a cross-section of the top plan view of the leg release mechanism in a locked mode;

FIG. 4 is a cross-section of the side elevation view of the leg release mechanism;

FIG. 5 is a cross-section of the top plan view of an alternate embodiment of a leg release mechanism in a locked mode; and FIG. 6 is a cross-section similar to FIG. 5 with the leg release mechanism in a released mode.

DETAILED DESCRIPTION OF THE PREFERRED EMBODIMENTS

Figure 1:
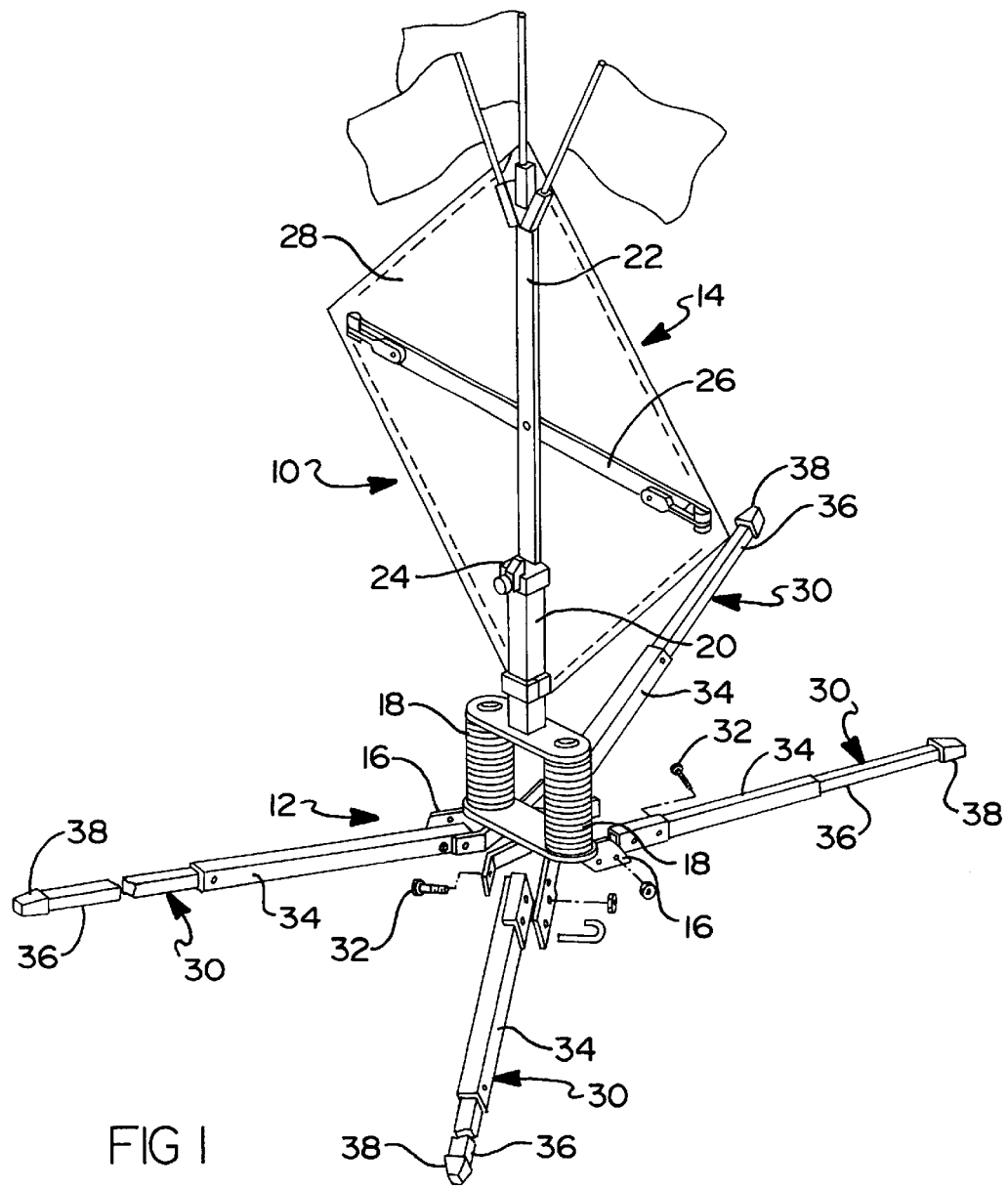
FIG. 1 is an environmental perspective view of the portable sign stand of the present invention.

The following description of the preferred embodiments is merely exemplary in nature and is in no way intended to limit the invention, its application, or uses.

With reference to the figures and in accordance with the teachings of the present invention, a portable sign assembly 10 is provided having a base assembly 12 and a sign assembly 14. The base assembly 12 includes a pair of base plates 16 secured to a pair of spring members 18. An upright 20 extends upward from the spring members 18 for selectively receiving a portion of a vertical brace 22 of the sign assembly 14. The upright 20 includes a sign release mechanism 24 for selectively fixing the vertical brace 22 within the upright 20. The sign assembly 14 includes the vertical brace 22 and a horizontal brace 26 for forming a cross configuration for supporting a flexible sign panel 28. As presently preferred, the spring members 18 are operably disposed between the base assembly 12 and the upright 20 such that the sign assembly 10 is resiliently supported from the base assembly 12 so as to flex when a wind load is applied, thus preventing the portable sign assembly 10 from tipping over. It should be appreciated that while the spring members 18 are depicted as a pair of coil springs, it may comprise a single coil spring or any other component or components that have the required resilience characteristics.

The base assembly 12 further includes four leg assemblies 30, each leg assembly 30 pivotally connected to the base plates 16 by a threaded fastener 32. Leg assembly 30 is of the telescopic type having an outer leg section 34 pivotally coupled to the corresponding base plate 16 and an inner leg section 36 telescopically received in the outer leg section 34 and selectively extendable therefrom. A rubber foot 38 is disposed on the end of each inner leg section 36 and functions to improve stability and prevent skidding of the portable sign assembly 10. As presently preferred, the inner leg section 36 includes a detent (not shown) for releasably holding the inner leg section 36 in an outwardly or fully extended position. The detent may comprise any number of mechanisms well known to those skilled in the art. An example of a preferred detent is illustrated and disclosed in U.S. Pat. No. 4,548,379 which is commonly owned by the assignee of the present invention and the disclosure of which is expressly incorporated by reference herein.

A support strap 42 may be secured to each leg assembly 30 on a side opposite to the base plate 16 for cooperating therewith to enhance the rigidity of the base assembly 12. As previously described, each leg assembly 30 is pivotally coupled to a corresponding base plate 16 via a threaded fastener 32. The leg assembly 30 further includes a leg release mechanism 50 disposed through an end of the outer leg section 34 and operable to engage the base plate 16 for positioning and releasably locking the leg assembly 30 in a retracted or stored position, or one of a plurality of protracted or deployed positions.

Figure 2:
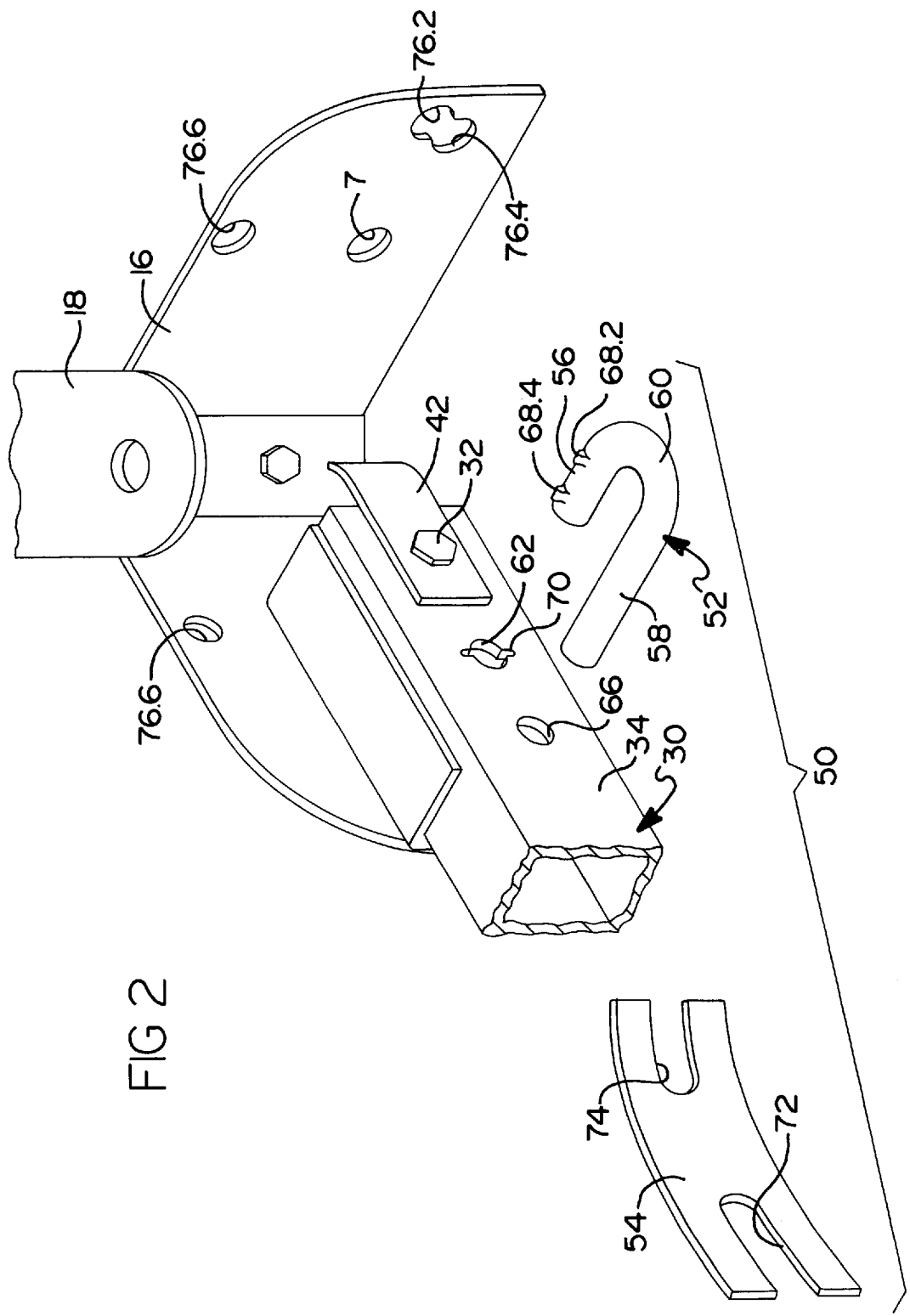
FIG. 2 is a perspective view of the leg release mechanism of the present invention.

With particular reference to FIGS. 2 through 4, the leg release mechanism 50 includes a generally J-shaped lock-pin 52 and a leaf spring 54. The lock-pin 52 includes first and second extensions or legs 56, 58 interconnected by an arcuate intermediary portion 60. The first extension 56 is received through an aperture 62 formed in outer leg section 34 and extends into aperture 64 formed in base plate 16. The second extension 58 is received through an aperture 66 formed in outer leg section 34. The first extension 56 is slightly shorter than the second extension 58. The first extension 56 has an ear 68.2 formed therein which engages the leaf spring 54 as best seen in FIG. 4. The first extension 56 also has a second ear 68.4 formed therein. The second ear 68.4 functions as a stop or limit to the travel of lock-pin 52 by engaging the inner wall 34.2 of the outer leg section 34. As presently preferred, aperture 62 has a radial slot 70 which allow ears 68.2, 68.4 to be received therein. Alternately, aperture 62 could be an oversized circular aperture.

A formed end cap 76 is affixed to the end of the second extension 58. End cap 76 provides an enlarged kick surface area 78 for an operator to position the lock mechanism 50 between the locked and released position. It should be noted, however, that the end cap 76 is optional, and force may be applied directly against the end of the first extension 56. The end cap 76, however, provides a larger target area for actuating the lock-pin 50.

Lock-pin 52 is operably coupled to leaf spring 54. Specifically, the second extension 58 is disposed through a slot 72 of the leaf spring 54 and is freely slidable relative thereto. A second slot 74 is also provided for passively receiving threaded fastener 32 therethrough. Ear 68.2 engages an outer surface 54.2 of leaf spring 54. As presently preferred, the leaf spring 54 is formed from a substantially flat piece of stainless spring steel that has been formed to have a bowed configuration. The leaf spring 54 biases the lock-pin 52 in a first direction (indicated by arrow A in FIG. 3) for locking the leg assembly 30 relative to the base plate 16, as described in further detail herein.

The lock-pin 52 is adapted to slide in a direction generally perpendicular to the longitudinal axis of the leg assembly 30 so as to be received into one of a plurality of apertures 76.2, 76.4, 76.6 formed through the base plate. In this manner, the leg assembly 30 may be locked into multiple positions. When the lock-pin 52 is received into the aperture 76.2, the leg assembly 30 is oriented at approximately three degrees (3°) downwardly from a horizontal as defined by a bottom edge of the base plate 16. The aperture 76.4 is formed in the base plate such that the leg assembly 30 is oriented at approximately fifteen to twenty degrees (15°–20°) downwardly from the horizontal. In this manner, a degree of adjustability is provided for placing the portable sign assembly 10 on an irregular (i.e. non-flat) surface. The third aperture 76.6 is formed in the base plate 16 and oriented such that the leg assembly 30 may be locked in a retracted position for compact storage.

With continued reference to FIGS. 2 through 4, operation of the leg release mechanism 50 will be described in detail. In a first, locked position, the leg assembly 30 is pivotally positioned about the threaded fastener 32 such that the lock-pin 52 is aligned with the aperture 76.2. The leaf spring 54 biases the lock-pin 52 in the direction of arrow A (as viewed in FIG. 3), whereby an end of the first extension 56 extends into the aperture 76.2 and engages the base plate 16. The ear 68.4 functions as a stop or limit for further movement of the lock-pin. In this position, the leg assembly 30 is prevented from further rotation about the threaded fastener 32, and thus releasably locked into the protracted position.

To move the leg assembly 30 into an alternate position, such as the retracted position, the lock-pin 52 is urged against the bias of the leaf spring 54 by pulling on the arcuate intermediary portion 58 or alternately pushing on the end cap 76 whereby the end of the first extension 56 is withdrawn from engagement with the aperture 76.2. As the lock-pin 52 disengages the base plate 16, the leaf spring 54 is compressed to a point where it is pressed substantially flat against an inner surface of the outer leg section 34. With the lock-pin 52 in this position, the leg assembly 30 may be pivotally positioned about the threaded fastener 32 with respect to the base assembly 12 and moved to a point where the lock-pin 52 is aligned with an alternate aperture such as apertures 76.4 or 76.6.

In an alternative embodiment, as shown in FIGS. 5 and 6, a lock-pin 152 may include a generally J-shaped member having first and second extensions 156, 158 interconnected by an arcuate intermediary portion 160. The second extension 158 of lock-pin 152 is shorter than second extension 58 of lock-pin 52 so as to remain within the interior volume outer leg member 34 when the lock-pin 152 is in the extended position. The leaf spring 54 is identical to that previously described. The first extension 156 is generally longer than the second extension 158 and extends through the leg assembly 30. The first extension 156 includes a circumferential groove 168 for engaging the leaf spring 54 and is disposed through a first slot 72 of the leaf spring 54, whereby corresponding edges of the first slot 72 engage the grooves 168. The second extension 158 is disposed through the first slot 72 of the leaf spring 54 and is freely slidable relative thereto. The free end of the second extension 158 engages the inner wall 34.2 of outer leg member 34 to provide a stop or limit to the travel of lock-pin 152. In general, operation of the alternative embodiment parallels that described hereinabove.

The present invention greatly simplifies the assembly of the leg release mechanism 50 into the leg assembly 30 over other prior art devices. The lock-pin 52 is insert completely through apertures 66, 70 of the leg assembly 30, whereby the first extensions 56, 58 simultaneously are received into the leg assembly 30. The use of a single lock-pin having a pair of legs eliminates the need to align and couple multiple pieces of conventional lock-pin assemblies. The lock-pin 52 is then held in the extended position. Spring 54 is positioned axially into the interior volume defined by the sidewalls of outer leg section 34. Extensions 56, 58 are received within slot 72 and ear 68.2 is located on the outer surface 54.2 of leaf spring 34. Spring 54 is preloaded or compressed slightly to position the spring on the underside of ear 68.2. Once properly located, spring 54 and ears 68.2, 68.4 cooperate to hold the spring in proper orientation and to bias the lock-pin toward the extended position.

As presently preferred, lock-pin 52, 152 is formed by bending a constant cross-section piece (e.g. ⅜" wire stock) to form a generally J-shaped pin. In the case of the first preferred embodiment, the ears 68.2, 68.4 may be swaged into lock-pin 52 during the bending operation to provide an engagement element having a diameter that is greater than the nominal diameter of the lock-pin 52. In this way, a very inexpensive component of the lock mechanism 50 is fabricated. In the case of the second embodiment, slot 168 is machined into lock-pin 152 in a post-bending operation to provide an engagement element having a diameter that is less than the nominal diameter of the lock-pin 152.

The assembly of leg release mechanism 150 is similar to that previously described with respect to leg release mechanism 50 with the following differences. The second extension 158 of lock-pin 152 is partially received into the outer leg member 34. Leaf spring 54 is operably coupled to lock-pin 152 by locating leaf spring 54 in groove 168. Once properly positioned, leaf spring 54 and the free end of second extension 158 cooperate to hold the leaf spring 54 in the proper orientation and to bias the lock-pin 152 toward the extended position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of constructing a leg release mechanism for a portable sign stand, the method comprising the steps of:

forming a lock-pin having a first leg, a second leg, an engagement element formed on said first leg and a stop;

forming a leg member having a side wall defining an interior volume and first and second apertures formed through said side wall;

inserting said lock-pin into said leg member in a first direction such that said first leg is received in said first aperture and said second leg is received in said second aperture simultaneously;

positioning said lock-pin in an extended position such that said stop engages said leg member and said engagement element is located within said interior volume;

forming a leaf spring having a slot formed therein;

applying a compressive force on said leaf spring and simultaneously inserting said leaf spring into a first end of said leg member such that said slot circumscribes said first leg; and releasing said compressive force on said leaf spring such that said engagement element engages said leaf spring to bias said lock-pin toward said extended position.

2. The method of constructing a leg release mechanism of claim 1 wherein said lock-pin is formed from a generally straight, constant diameter elongated member.

3. The method of constructing a leg release mechanism of claim 1 wherein the step of forming a lock-pin comprises the step of swaging said lock-pin to form an ear having a dimension greater than the diameter of said first leg for engaging said leaf spring.

4. The method of constructing a leg release mechanism of claim 3 wherein the step of forming a lock-pin comprises the step of swaging said lock-pin to form a second ear having a dimension greater than the diameter of said first leg, said second ear engaging said leg member when said lock-pin is in said extended position.

5. The method of constructing a leg release mechanism of claim 1 further comprising the step of securing an end cap on a free end of said second leg extending through said leg member.

6. The method of constructing a leg release mechanism of claim 1 wherein the step of forming a lock-pin comprises the step of machining said lock-pin to form an slot having a dimension less than the diameter of said first leg for engaging said leaf spring.

7. The method of constructing a leg release mechanism of claim 1 further comprising the step of forming a free end on said second leg, said free end engaging said leg member when said lock-pin is in said extended position.

8. The method of constructing a leg release mechanism of claim 1 further comprising the steps of:

forming a base plate having an aperture formed therethrough; and pivotally coupling said leg member to a base plate at an end of said leg member adjacent said lock-pin such that said first leg of said lock-pin extends into said base plate aperture when said lock-pin is in said extended position.

9. A method of constructing a leg release mechanism for a portable sign stand, the method comprising the steps of:

providing a generally U-shaped lock-pin having a first and second leg, said lock-pin formed from a generally straight, constant diameter elongated member;

swaging said lock-pin to form an engagement element on at least one of said first and second leg, forming a leg member having a side wall defining an interior volume and first and second apertures formed through said side wall;

inserting said lock-pin into said leg member in a first direction such that said first leg is received in said first aperture and said second leg is received in said second aperture;

positioning said lock-pin in an extended position such that said engagement element is located within said interior volume;

forming a leaf spring having a slot formed therein;

applying a compressive force on said leaf spring and simultaneously inserting said leaf spring into a first end of said leg member such that said slot circumscribes said first leg;

releasing said compressive force on said leaf spring such that said engagement element engages said leaf spring to bias said lock-pin toward said extended position;

securing an end cap on an end of said second leg extending through said leg member;

forming a base having an aperture formed therethrough; and pivotally coupling said leg member to a base at an end of said leg member adjacent said lock-pin such that said first leg of said lock-pin extends into said base aperture when said lock-pin is in said extended position.

10. A leg release mechanism for a portable sign stand comprising:

a base having an aperture formed therein;

a leg member pivotally coupled to said base, said leg member having a side wall defining an interior volume and first and second apertures formed through said side wall, at least one of said first and second apertures being an oversized hole;

a generally J-shaped lock-pin having a first leg extending through said first aperture and a second leg extending through said second aperture, said lock-pin further including a pair of ears formed on said first leg located and movable within said interior volume, said pair of ears received through said oversized hole; and a leaf spring having a slot formed therein, at least a portion of said lock-pin being received in said slot such that said pair of ears engages said leaf spring to operatively couple said lock-pin and said leaf spring;

said lock-pin being positionable between an extended position wherein said stop engages said leg member and said first leg extends into said aperture formed in said base for prohibiting pivoting of said one of leg member relative to said base and a retracted position wherein said first leg retracts from said aperture formed in said base for enabling pivoting of said leg member relative to said base.

11. The leg release mechanism of claim 10 wherein said lock-pin comprises a generally constant diameter member.

12. The leg release mechanism of claim 10 wherein said stop and said engagement element comprise a pair of ears swaged into said first leg.

13. The leg release mechanism of claim 12 wherein said engagement element comprises a groove formed in said first leg.

14. The leg release mechanism of claim 10 further comprising an end cap disposed on an end of said second leg extending through said leg member.

15. A method of constructing a leg release mechanism for a portable sign stand, the method comprising the steps of:

inserting a lock-pin into a leg member in a first direction such that a first leg of said lock-pin is received in a first aperture of said leg member and a second leg of said lock-pin is received in a second aperture of said leg member;

positioning said lock-pin in an extended position such that an engagement element formed on said first leg is located within an interior volume of said leg member;

providing a leaf spring having a slot formed therein;

applying a compressive force on said leaf spring and simultaneously inserting said leaf spring into a first end of said leg member such that a slot formed in said leaf spring circumscribes said first leg; and releasing said leaf spring such that said engagement element engages said leaf spring to bias said lock-pin toward said extended position.

16. The method of constructing a leg release mechanism of claim 15, wherein said lock-pin is formed from a generally straight, constant diameter elongated member.

17. The method of constructing a leg release mechanism of claim 15, wherein said engagement element includes two ears extending from an exterior surface of said lock pin, said ears having a dimension greater than the diameter of said first leg for engaging said leaf spring.

18. The method of constructing a leg release mechanism of claim 17, wherein said ears act as a stop for engaging an interior surface of said leg member when said lock-pin is in said extended position.

19. The method of constructing a leg release mechanism of claim 15, further comprising the step of securing an end cap on a free end of said second leg extending through said leg member.

20. The method of constructing a leg release mechanism of claim 15, wherein the step of forming a lock-pin comprises the step of machining said lock-pin to form an slot having a dimension less than the diameter of said first leg for engaging said leaf spring.

21. The method of constructing a leg release mechanism of claim 15, further comprising the step of forming a free end on said second leg, said free end engaging said leg member when said lock-pin is in said extended position.

22. The method of constructing a leg release mechanism of claim 15, further comprising the steps of:

forming a base plate having an aperture formed therethrough; and pivotally coupling said leg member to a base plate at an end of said leg member adjacent said lock-pin such that said first leg of said lock-pin extends into said base plate aperture when said lock-pin is in said extended position.

23. The method of constructing a leg release mechanism of claim 15, wherein said first and second legs of said lock-pin are fixedly connected by an arcuate member such that said lock-pin comprises a generally U-shape.

* * * * *

UNITED STATES PATENT AND TRADEMARK OFFICE
CERTIFICATE OF CORRECTION

PATENT NO.         : 6,755,381 B1
APPLICATION NO. : 10/041345
DATED                  : June 29, 2004
INVENTOR(S)        : Yevgeniy M. Levin It is certified that error appears in the above-identified patent and that said Letters Patent is hereby corrected as shown below:

The corresponding location in the application of the errors in question are as follows:

Column 5, line 21; (Application page 10, line 22);
"inset" should be -- inserted --;

Column 6, line 38, Claim 6; (Application page 14, line 18, Claim 6);
"an" should be -- a --;

Column 7, line 41, Claim 10; (Application page 2, line 16, Claim 10);
Add -- one of -- before the word "said";

Column 7, line 41, Claim 10; (Application page 2, line 17, Claim 10);
Delete "stop" and insert -- pair of ears --;

Column 7, line 43, Claim 10; (Application page 4, line 15, Claim 10;
After second occurrenece of "said" delete "one of";

Column 7, line 51, Claim 12; (Application page 2, line 19, Claim 12);
Delete "stop and said engagement element comprise a";

Column 7, line 51, Claim 12; (Application page 2, line 20, Claim 12);
After "ears" insert -- are --;

Column 7, line 53, Claim 13; (Application page 2, line 22, Claim 13);
"12" should be -- 10 --;

Column 7, line 54, Claim 13; (Application page 3, lines 1-2, Claim 13);
Delete "engagement element comprises" and insert -- pair of ears define --;

Column 8, line 6, Claim 15; (Application page 3, line 4, Claim 15);
Insert -- simultaneously -- before "received";

Column 8, line 10, Claim 15; (Application page 3, lines 5-6, Claim 15);
After "leg member" insert -- and a stop formed on said lock-pin engages said leg member --;

Column 8, line 14, Claim 15; (Application page 3, line 7, Claim 15);
After "that" delete "a" and insert -- said --;

UNITED STATES PATENT AND TRADEMARK OFFICE
CERTIFICATE OF CORRECTION

PATENT NO.        : 6,755,381 B1
APPLICATION NO.   : 10/041345
DATED             : June 29, 2004
INVENTOR(S)       : Yevgeniy M. Levin It is certified that error appears in the above-identified patent and that said Letters Patent is hereby corrected as shown below:

Column 8, line 37, Claim 20; (Application page 6, line 11, Claim 20;
After "form", "an" should be -- a --.

Signed and Sealed this

Nineteenth Day of December, 2006

JON W. DUDAS
*Director of the United States Patent and Trademark Office*